United States Patent
Yu et al.

(10) Patent No.: US 10,474,157 B2
(45) Date of Patent: Nov. 12, 2019

(54) DATA-BASED CONTROL ERROR DETECTION AND PARAMETER COMPENSATION SYSTEM

(71) Applicant: Baidu USA LLC, Sunnyvale, CA (US)

(72) Inventors: Xiang Yu, Sunnyvale, CA (US); Qi Kong, Sunnyvale, CA (US); Qi Luo, Sunnyvale, CA (US); Fan Zhu, Sunnyvale, CA (US); Sen Hu, Sunnyvale, CA (US); Guang Yang, San Jose, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 177 days.

(21) Appl. No.: 15/615,378

(22) Filed: Jun. 6, 2017

(65) Prior Publication Data
US 2018/0348775 A1    Dec. 6, 2018

(51) Int. Cl.
| G05D 1/02 | (2006.01) |
| B60W 40/10 | (2012.01) |
| B60W 50/00 | (2006.01) |
| B60W 30/14 | (2006.01) |

(52) U.S. Cl.
CPC .......... G05D 1/0221 (2013.01); B60W 40/10 (2013.01); B60W 30/14 (2013.01); B60W 2050/0028 (2013.01); G05D 2201/0213 (2013.01)

(58) Field of Classification Search
CPC .. G05D 1/0221; G05D 1/0223; G05D 1/0088; G05B 13/0265; G05B 13/042; G05B 13/044; G05B 13/047; G05B 13/048; B60W 40/10; B60W 40/105; B60W 40/112; B60W 50/0225; B60W 50/029; B60W 2050/0028
See application file for complete search history.

(56) References Cited

U.S. PATENT DOCUMENTS

| 4,700,302 A | * | 10/1987 | Arakawa | G05D 1/0265 180/168 |
| 5,606,505 A | * | 2/1997 | Smith | G05D 1/0005 701/15 |
| 6,611,737 B1 | * | 8/2003 | El-Tahan | G05D 1/0206 701/21 |

(Continued)

Primary Examiner — Behrang Badii
Assistant Examiner — David A Testardi
(74) Attorney, Agent, or Firm — Womble Bond Dickinson (US) LLP

(57) ABSTRACT

State of an autonomous driving vehicle (ADV) is measured and stored for a location and speed of the ADV. Later, the state of the ADV is measured for the location and speed corresponding to a previously stored state of the ADV at the same location and speed. Fields of the measured stored states of the ADV are compared. If one or more differences between the measured and stored ADV states exceeds a threshold, then one or more control input parameters of the ADV is adjusted, such as steering, braking, or throttle. Differences may be attributable to road conditions or to state of servicing of the ADV. Differences between measured and stored states of the ADV can be passed to a service module. Service module can access crowd sourced data to determine whether one or more control input parameters for a driving state of one or more ADVs should be updated.

21 Claims, 11 Drawing Sheets

(56) References Cited

U.S. PATENT DOCUMENTS

| | | | |
|---|---|---|---|
| 9,315,178 B1* | 4/2016 | Ferguson | B60T 17/221 |
| 9,381,916 B1* | 7/2016 | Zhu | B60W 30/0956 |
| 9,495,874 B1* | 11/2016 | Zhu | G06N 20/00 |
| 10,001,760 B1* | 6/2018 | Hoffmann | B25J 9/163 |
| | | | 700/250 |
| 2007/0156294 A1* | 7/2007 | Tipping | G05B 13/0265 |
| | | | 701/1 |
| 2008/0133066 A1* | 6/2008 | Takenaka | B60G 17/0195 |
| | | | 701/1 |
| 2009/0088918 A1* | 4/2009 | Takenaka | B60T 8/17551 |
| | | | 701/31.4 |
| 2009/0118905 A1* | 5/2009 | Takenaka | B60T 8/17552 |
| | | | 701/41 |
| 2009/0276111 A1* | 11/2009 | Wang | B60T 8/17551 |
| | | | 701/23 |
| 2014/0277718 A1* | 9/2014 | Izhikevich | B25J 9/163 |
| | | | 700/250 |
| 2015/0127150 A1* | 5/2015 | Ponulak | B25J 9/163 |
| | | | 700/250 |
| 2015/0148953 A1* | 5/2015 | Laurent | B25J 9/163 |
| | | | 700/250 |
| 2017/0131719 A1* | 5/2017 | Micks | B60W 40/08 |

\* cited by examiner

FIG. 5

| | | | Stored Data 501 | | | | | Real-Time Data 502 | |
|---|---|---|---|---|---|---|---|---|---|
| | Index 505 | | t=Current 510 | | t+Δt=Next 515 | | | t+Δt=Next 515' | |
| t | Location 510 | Speed 512 | State 520 | Control Inputs 525 | State 530 | Control Inputs 535 | | State 530' | Control Inputs 535' |
| t0 | N37°44'42.02" W122°26'18.1" | 5.0 mps | heading 0°<br>pitch 0°<br>roll -0.1° | brake 1%<br>throttle 0%<br>steering +3° | heading +3°<br>pitch 0°<br>roll -0.1° | brake 1%<br>throttle 0%<br>steering +3° | | heading +3°<br>pitch 0°<br>roll -0.2° | brake 2%<br>throttle 0%<br>steering +3.5° |
| t1=t0+Δt | N37°44'42.15" W122°26'18.2" | 4.9 mps | heading 3°<br>pitch 0°<br>roll -0.1° | brake 1%<br>throttle 0%<br>steering +3° | heading +6°<br>pitch 0°<br>roll -0.2° | brake 1.5%<br>throttle 0%<br>steering +3° | 575 | heading +6°<br>pitch 0°<br>roll -0.3° | brake 2.5%<br>throttle 0%<br>steering +4.0° |
| t2=t1+Δt | N37°44'42.32" W122°26'18.3" | 4.7 mps | heading 6°<br>pitch 0°<br>roll -0.2° | brake 1.5%<br>throttle 0%<br>steering +3.0° | heading +9°<br>pitch 0°<br>roll -0.3° | brake 2.0%<br>throttle 0%<br>steering +3° | | heading +9°<br>pitch 0°<br>roll -0.4° | brake 3.0%<br>throttle 0%<br>steering +4.5° |

550 → (row t0)
555 → (row t1)
560 → (row t2)

500

DATA-BASED CONTROL ERROR DETECTION AND PARAMETER COMPENSATION SYSTEM

TECHNICAL FIELD

Embodiments of the present invention relate generally to operating autonomous vehicles. More particularly, embodiments of the invention relate to improving control of an autonomous vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

For a given set of driving conditions, an autonomous driving vehicle (ADV) control system can determine control inputs such as steering, throttle, and braking. Over time, physical attributes of the vehicle can affect the effectiveness of the inputs at accurately maintaining course, speed, heading, safety, and passenger comfort. Tire wear, brake wear, shock absorber wear, state of front end alignment, state of the ignition and fuel delivery systems can all affect the performance of a vehicle. Human drivers naturally take these changes into account as they drive. Autonomous vehicle control systems currently do not take vehicle wear and aging into account when determining autonomous driving control inputs.

BRIEF DESCRIPTION OF THE DRAWINGS

Embodiments of the invention are illustrated by way of example and not limitation in the figures of the accompanying drawings in which like references indicate similar elements.

FIG. 5 illustrates a table of an ADV state database used to determine changes in vehicle performance and for tuning ADV control input parameters, according to some embodiments.

DETAILED DESCRIPTION

Figure 1:
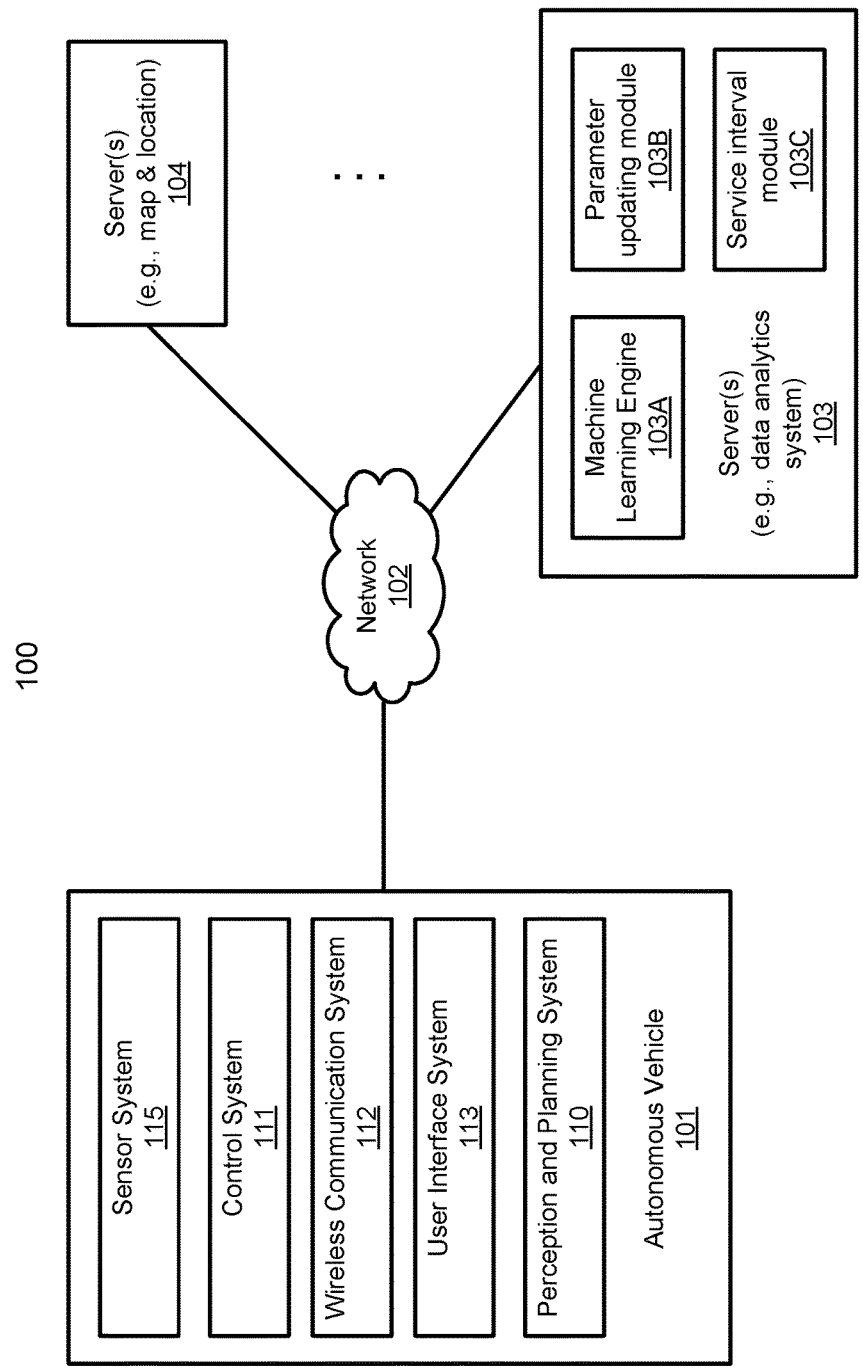
FIG. 1 is a block diagram illustrating an overview of a networked autonomous driving vehicle (ADV) system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In an embodiment, a computer-implemented method of operating an autonomous driving vehicle (ADV) includes determining, for a time t0, a first state of the ADV including ADV speed, location, and control inputs. An ADV state database is accessed using one or more portions of the first state of the ADV corresponding to a time t0, to retrieve a second state of the ADV corresponding to a time t1. A real-time state of the ADV is measured for time t1. One or more fields of the stored state of the ADV for t1 and corresponding fields of the measured state for t1 can be compared. In response to determining that a difference between one or more fields of the stored and measured states is greater than a threshold value, one or more control input parameters of the ADV can be adjusted. A control input parameter is a modifier for a stored or computed control input determined by control system 111. A control input parameter can be scalar factor in the range −2.0 . . . +2.0 or a percentage change such as −100% . . . +100% to a control input determined by control system 111. There can be multiple control input parameters for a single control input, e.g. brakes. Each control input parameter for the control input can cover an identified operating range of the ADV such as 0 . . . 30 mph, 30 . . . 45 mph, and 45 . . . 80 mph. Control input parameters can be stored in persistent storage. Control input parameters can be temporary in life span. For example, after the brakes on the ADV have been serviced, a service technician may reset one or more of the control input parameters for a brake control input.

In an embodiment, a state of the ADV can include one or more of: a location of the ADV, a speed of the ADV, a heading of the ADV, a pitch of the ADV, a roll of the ADV, control input for brakes, control input for throttle, or control input for steering. In an embodiment, for a given ADV state, when a measured real-time brake control input value is within threshold tolerance of a stored brake control input value for the ADV state, the state analysis module can perform one of: increasing a brake control input parameter in response to determining that a measured real-time state speed is greater than the stored state speed by at least a speed error value, or decreasing the brake control input parameter in response to determining that the measured real-time speed is less than the stored state speed by at least the speed error value. In an embodiment, when a measured steering control input value is within threshold tolerance of a stored steering control input value for a state, the state analysis module can perform one of: increasing a steering control input parameter in response to determining that the measured real-time state heading is less than the stored state heading (under-steer) by at least a steering error value, or decreasing the steering control input parameter in response to determining that the measured real-time state heading is greater than the stored state heading value (over-steer) by at least the steering error value. In an embodiment, when a measured real-time throttle control input value is within a threshold tolerance of a stored throttle control input value for a state, the state analysis module can perform one of: increasing a throttle control input parameter in response to determining the measured real-time state speed is less than the speed in the stored state by a speed error value, or decreasing the throttle input parameter in response to determining that the measured real-time state speed is greater than the speed in the stored state by the speed error value.

In an embodiment, state analysis module can issue an alert that one or more sub-systems of the ADV that respond to the one or more control inputs are in need of adjustment or repair. A subsystem of the ADV can be a brake systems, steering system, engine and accelerator system, shock absorbers, tires, and the like. A stored state of the ADV can be looked up using a measured real-time location and speed of the ADV, and optionally a heading of the ADV. In an embodiment, the stored state can be looked up using a location and speed of the ADV that uses tolerances on the location and/or speed such that the ADV be can be substantially at a location or substantially at a speed, rather than exactly at a location or exactly at a speed.

In another embodiment, a server system can include a machine learning engine, a parameter updating module, and a service interval module. The server can select a control input parameter to train upon. The server can select, from crowd source data of a large plurality of ADVs, state analysis module records that indicate that the selected control input parameter was changed for an ADV. Machine learning engine can train on the selected crowd source data for the selected control input parameter and can determine one or more causes for changes to the selected control input parameter over the large plurality of ADVs and determine a trend in changes to the selected control input parameter. Parameter update module can submit the trend and supporting data, and a suggested control input parameter change for at least a subset of the ADVs in the large plurality of ADVs, to an engineering staff for review. If engineering approves the control input parameter change, then parameter update module can disseminate the control input parameter change to at least a subset of the large plurality of ADVs. In an embodiment, parameter update module can in addition, or alternatively, send a notification to at least a subset of the large plurality of ADVs that a particular service or services are recommended for the ADVs in the subset based upon an analysis of the selected data and selected control input parameter. Such notification can be displayed on a user interface within the ADVs.

FIG. 1 is a block diagram illustrating an overview of a networked autonomous driving vehicle (ADV) system 100 according to one embodiment of the invention. Referring to FIG. 1, network configuration 100 includes autonomous vehicle 101 that may be communicatively coupled to one or more servers 103-104 over a network 102. Although there is one autonomous vehicle 101 shown, multiple autonomous vehicles can be coupled to each other and/or coupled to servers 103-104 over network 102. Network 102 may be any type of network such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc. An example server system is described below with reference to FIG. 10.

An autonomous vehicle 101 refers to a vehicle that can be configured in an autonomous mode in which the vehicle navigates through an environment with little or no control input from a driver. Such an autonomous vehicle 101 can include a sensor system 115 having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

Server 103 can include a data analytics system that includes a machine learning engine 103A, a parameter updating module 103B, and a service interval module 103C. Each such module can be implemented in software, hardware, or a combination thereof. In an embodiment, modules 103A, 103B, and 103C comprise at least one hardware processor.

Parameter updating module 103B can update one or more control input parameter values on one or more ADVs via network 102. Each of a large plurality of ADVs can have an ADV control system 111 that can have a control input for each of a plurality of ADV controls. ADV controls can include throttle input, brake input and steering input. Control inputs can be generated by perception and planning module 110 and control system 111. To ensure that an ADV stays on course, and ensures safety and comfort of passengers, control inputs may need to be modified slightly during autonomous driving, particularly when the ADV subsystems such as tires, brakes, and steering begin to age and wear. A control input, such as a brake input, can have one or more control input parameters that act to modify computed or stored control input values. Parameter updating module 103B can access a database of a large plurality of ADVs and select a subset of the database for analysis on a selected control input type, e.g. throttle input. Machine learning engine 103A can train on the control input parameter changes to the throttle input over the large plurality of ADV data and determine one or more causes of the need to change a control input parameter.

Service interval module 103C can receive the notification of a control parameter being changed more than a threshold amount, and perform one or more diagnostics based on the notification. In an embodiment, parameter updating module 103B can pass to the service interval module 103C a copy of, or a reference to, the database records of heading, state at time t, stored next state at time t+Δt, and the measured real-time next state at time t+Δt that triggered a parameter change. In an embodiment, service interval module 103C can keep a log of all such notifications for all headings, locations and speeds of the ADV. Service interval module 103C can invoke machine learning engine 103A to learn patterns in the received notifications that indicate one or more possible causes of received notification(s) of a changed driving parameter. For example, service interval module 103C can learn a pattern in control input parameter changes that indicates that the ADV has an increase in roll (lateral pitch) and under-steer, indicating possible wear to shock absorbers, tires, or steering alignment. Similarly, service interval module 103C can learn a pattern that, to maintain heading and speed, control input parameter change(s) have been needed that increase throttle, indicating that the ADV may need service for spark plugs, timing, air/fuel mixture, fuel injectors, valve timing, transmission or other engine performance service, or that tire pressure has dropped below a certain threshold.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111. In an embodiment, a planning portion of the perception and planning module 110 can be turned off. In an embodiment, control system 111 can be turned off. The autonomous vehicle 101 can then be driven by a human driver while the planning and control modules are turned off. The embodiments described herein utilize the planning module 110 and control systems 111, which are turned on.

In operation, a user as a passenger may specify a starting location and a destination of a trip, for example, via a user interface 113. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

In an autonomous vehicle 101, there may be no actual or physical window. Rather, a "window" (referred to herein as a virtual window) may be represented or replaced by a display device, i.e., a flat or curved screen display device molded into a shape of a vehicle window, optionally with a touch screen. The display device would display images or stream of images (e.g., video) that are captured dynamically in real-time by an appropriate camera or cameras, as if the user were watching or viewing the actual physical content through a see-through window. For each of the "windows" (e.g., display devices), there can be a corresponding display channel to stream the corresponding content to be displayed at real-time, which may be centrally processed by an augmenting reality system, e.g., a data processing system 110. In such situation, an augmented image is displayed in a virtual reality manner via infotainment system 114, also referred to as an augmented reality manner.

In embodiments described herein, outputs from each sensor in the sensor system 115 can be logged while the autonomous vehicle 101 driven in automated mode, with the planning and control modules turned on. Inputs to components of the control system 111 can be provided by the planning module 110.

Figure 2:
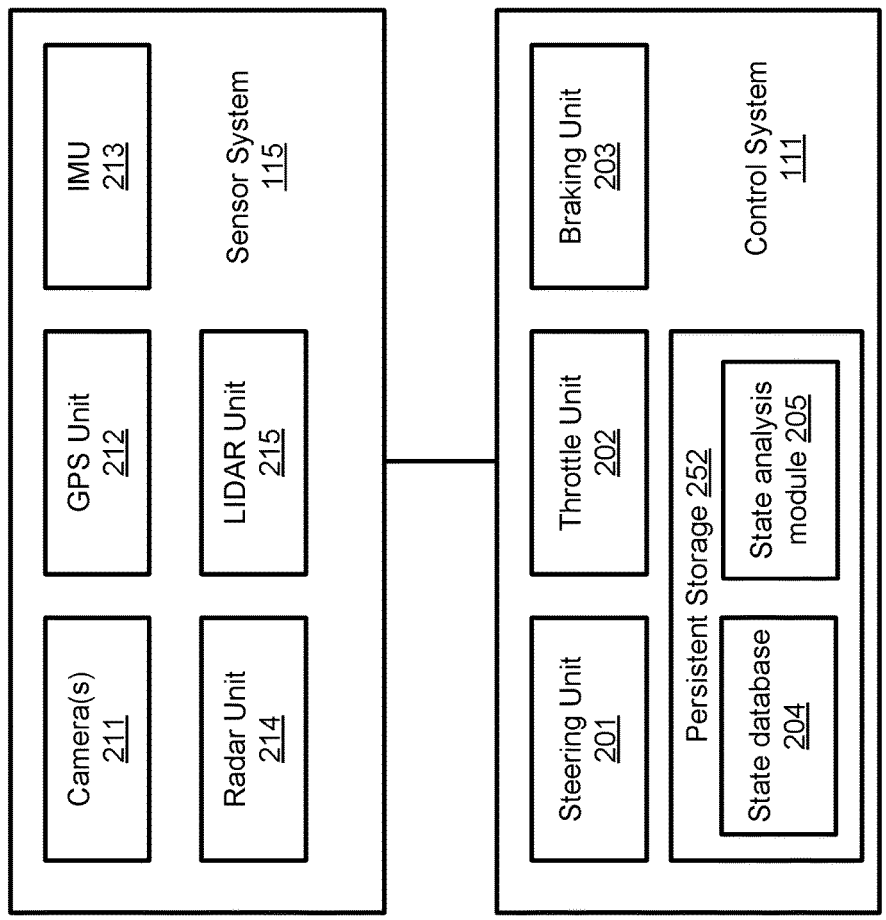
FIG. 2 is a block diagram illustrating an example of an ADV sensor and control module, according to one embodiment of the invention.

FIG. 2 is a block diagram illustrating an example of an autonomous driving vehicle (ADV) sensor and control module, according to one embodiment of the invention.

Referring to FIG. 2, in one embodiment, sensor system 115 can include, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as a sonar sensor, an infrared sensor, a steering sensor, a throttle sensor, a braking sensor, and an audio sensor (e.g., microphone). An audio sensor may be configured to capture sound from the environment surrounding the autonomous vehicle 101. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor. Sensor system 115 may further include one or more horizontal measurement sensors. For example, a first horizontal measurement sensor may indicate whether the ADV is facing downhill, or uphill, and if so, a measurement of the forward/rearward tilt, e.g. in degrees or other angular measure. A second horizontal measurement sensor may measure lateral tilt, such as whether the ADV is tilted left or right.

In one embodiment, vehicle control system 111 can include, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof. Vehicle control system 111 can further include a persistent storage 252. Persistent storage 252 can be a ROM, RAM, battery backed RAM, solid state storage device, hard disk, CD-ROM, DVD-ROM or other persistent storage. Persistent storage 252 can include state database 204 and executable program instructions, stored in the persistent storage 252, that when executed by, e.g., a hardware processor can execute the program instructions to implement a state analysis module 205.

As described above and in with reference to FIG. 5, below, state database 204 can include a database of records that store state data at a time t in association with a next state t+$\Delta$t for a plurality of locations and speeds. For a new driving route, for which driving states do not yet exist in the state database 204, records 550, 550, and 560, etc. can represent sequential states $t_0, t_1, t_2, \ldots t_n$ starting at a time t=$t_0$, and incrementing with each next state t+$\Delta$t.

State information for a current state at a time t, or a next state at time t+$\Delta$t, can include a location of the ADV, a heading, a speed, a pitch of the ADV (forward/backward tilt of the ADV), a roll of the ADV (left/right tilt of the ADV), a forward/backward acceleration of the ADV, a lateral acceleration of the ADV, and control inputs including brake input, steering input, and throttle input. Location can be a GPS location, coordinates within a high definition map of sensor data, or other location system. Speed of the ADV can be measured in miles per hour (mph), kilometers per hour (kph), meters per second (mps), or other relevant unit of measure.

State analysis module 205 can determine differences between a stored next state at a time t+$\Delta$t and a measured real-time next state at time t+$\Delta$t. Based on the differences, state analysis module 205 can determine whether one or more state values in the measured next state differ from the stored next state values by more than a threshold amount. The threshold amount of difference can be, e.g., 1% difference, 5% difference, or 10% difference. In an embodiment, difference can be measured in another unit, such as degrees of steering input, degrees of rotation of a pitch or roll sensors, or acceleration such as from an accelerometer or inertial force sensor. Based on a measured next state value being more than the threshold difference from the corresponding value in the stored next state t+$\Delta$t, state analysis module 205 can determine one or more changes to one or more control input parameters of control system 111. For example, if the stored state for time t at a location and speed indicates a heading of 0°, and the stored next state at t+$\Delta$t indicates +3° heading, but the measured real-time next state heading is +2° (indicating possible under-steer, or wet road or slippery road conditions), the state analysis module 205 can determine that a throttle input parameter should be changed from 4% to 3% (slow down), and/or a brake input parameter changed from 3% to 4% (more brakes), and/or an increase in steering input parameter change from +3° to +4° (turn more sharply). In an embodiment, state analysis module 205 can determine that another state value should be taken into account, such as the road condition being slippery due to rain or gravel. In such case, state analysis module 205 can balance the best control input parameter change(s) to make based upon the road condition and the magnitude and nature of the differences between the stored next state and measured next state at time t+$\Delta$t. For example, state analysis module 205 can determine that a combination of less throttle, more brake, and more steering input may be safer or give more passenger comfort, than, e.g., using only less throttle or only more steering input. In an embodiment, parameter updating module 103B can use machine learning engine 103A to learn optimal control input parameter changes for certain driving conditions from a large plurality of ADV data, and later download one or more control input parameter updates to one or more ADVs for improving driving performance for ADVs, generally. Such learning can take into account additional sensors such as pitch, roll, or accelerometer sensors that can reflect passenger comfort, in addition to state information that indicates adherence to a driving plan, path, or course.

Figure 3:
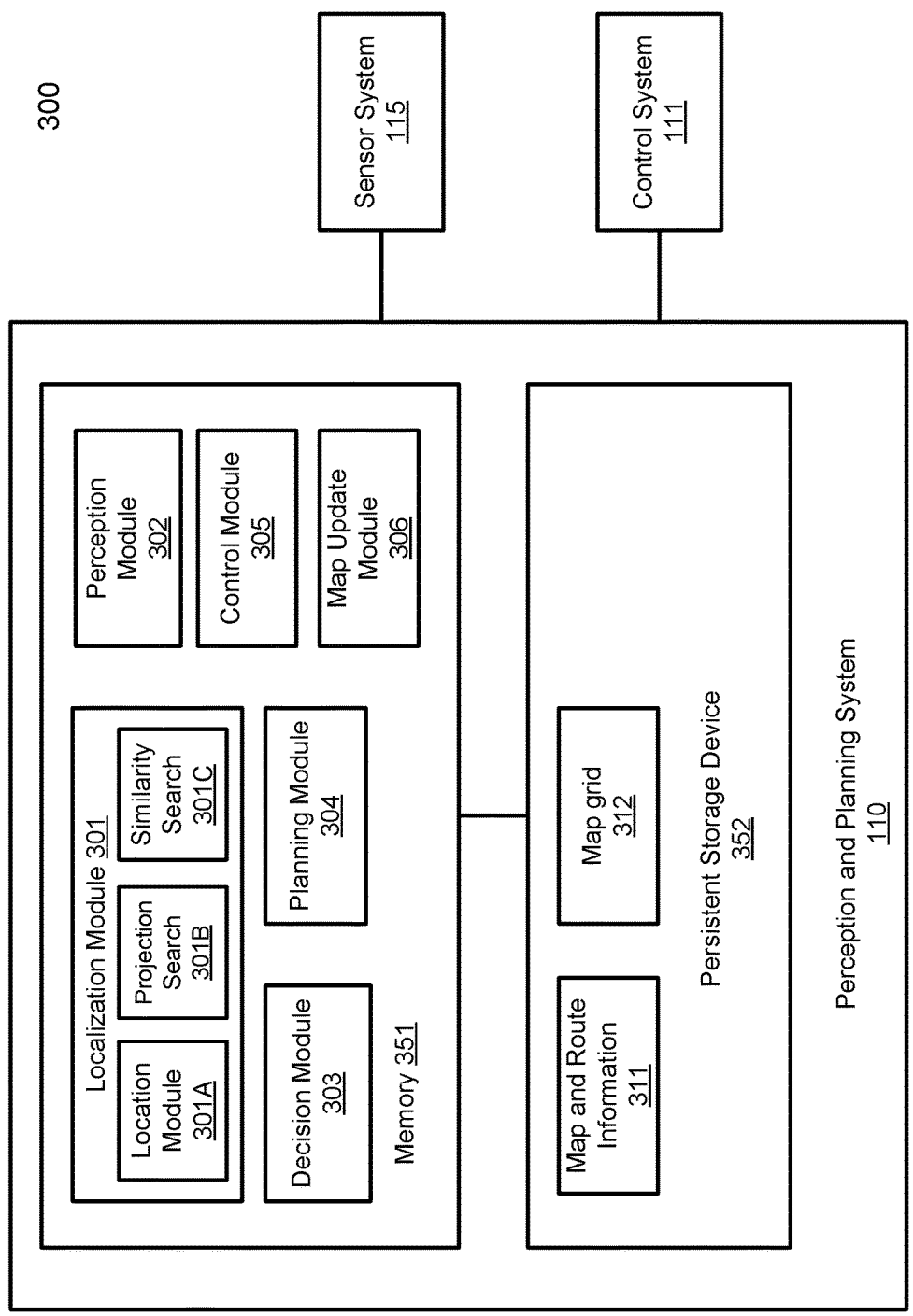
FIG. 3 is a block diagram illustrating an example of an ADV perception and planning system, according to one embodiment of the invention.

FIG. 3 is a block diagram illustrating an example of a system 300 comprising an ADV perception and planning system 110, sensor system 115, and control system 111 according to one embodiment of the invention. System 300 may be implemented as a part of autonomous vehicle 101 of FIG. 1. Referring to FIG. 3, perception and planning system 110 includes, but is not limited to, localization module 301, perception module 302, decision module 303, planning module 304, control module 305, and a map update module 306.

Some or all of modules 301-306 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-306 may be integrated together as an integrated module.

Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and point-of-interest (MPOI) server. A location server provides location services and an MPOI server provides map services and the points of interest (POIs) of certain locations, which may be cached as part of map and route information 311. While autonomous vehicle 300 is moving along the route, localization module 301 may also obtain real-time traffic information from a traffic information system or server.

An object of the localization module 301 is to determine with high accuracy a location of the ADV. ADV location can be approximately determined using, e.g. GPS. The GPS coordinate can be used to obtain a high definition (HD) map with a center at the GPS location and having an HD map feature space of cells of approximately 100 meters×100 meters. The ADV onboard sensors of the perception module 302 can also generate an ADV feature space of cells of approximately 100 meters×100 meters surrounding the ADV. To determine the actual location of the ADV with respect to the HD map, localization module 301 can find a best match of a candidate cell in a candidate portion of the ADV feature space to the HD map. The match determines an offset of the ADV from the GPS-centered HD map feature space. This offset can be used, in conjunction with the HD map feature space, to determine the actual high accuracy location of the ADV.

Localization module 301 can include a location module 301A, and a search module 301B. A location module 301A can obtain a 3D point cloud of sensor data from the sensors in perception module 302. The 3D point cloud represents sensor data surrounding the ADV. Location module 301A can analyze the 3D point cloud and generate an ADV feature space of cells of data, each representing an area of approximately 10 cm×10 cm. Each cell can have an (x,y) coordinate in the ADV feature space, a mean intensity and a variance of the elevation. In an embodiment, the ADV feature space can contain approximately 1024×1024 cells surrounding the ADV. The location module 301A can also obtain an approximate location of the ADV from, e.g. a GPS reading or coordinating with cell towers. The location module 301A can also obtain a high definition (HD) map of cells representing an HD map feature space of approximately 1024×1024 cells surrounding the GPS coordinate. Each cell of the HD map feature space can have an (x,y) coordinate representing an actual location of the cell in a real coordinate space, such as high resolution GPS or other coordinate system. Each cell of the HD map feature space can further include a mean intensity for the cell, and a variance of the elevation in the cell. The HD map feature space can further include annotations, including actual high-resolution location of each cell of the HD map, street address information, business information, restaurants, gas stations, and other useful information.

The approximate accuracy of GPS is about 3 meters resolution. Projection search module 301B can determine a candidate space of, e.g., 32×32 cells, surrounding the ADV, and match an ADV feature space of, e.g., 1024×1024 cells surrounding each candidate cell of the candidate space with an HD map feature space of, e.g., 1024×1024 cells.

A projection search module 301B can determine a candidate space of, e.g., 32×32 cells, surrounding the ADV. For each candidate cell of the candidate space, projection search module 301B can match an ADV feature space of, e.g., 1024×1024 cells surrounding the candidate cell with an HD map feature space of, e.g., 1024×1024 cells. A projection search module 301B can use a kernel projection method to determine a similarity score, or distance measure, between the ADV feature space surrounding each candidate cell and the HD map feature space. In an embodiment, projection search module 301B can determine a matching of an ADV feature space surrounding each candidate cell in a first sub-set of the candidate space. Projection search module 301B can determine a set of projection kernels to use for matching each ADV feature space surrounding a candidate cell of the first sub-set with the HD map feature space. In an embodiment, the set of projection kernels can comprise Gray Code Kernels. In an embodiment, the set of projection kernels can be ordered set such that the lowest ordered (first) dimension projection vector captures a largest portion of the similarity of the ADV feature space surrounding the candidate to the HD map feature space. Subsequent dimension projection kernels can capture increasingly finer amounts of feature space energy. Thus, using only a few kernel projections, a substantial amount of the matching information can be determined. Projection search module 301B can project the ADV feature space surrounding each candidate cell in the first sub-set onto a first projection kernel of the HD map feature space. In an embodiment, if the similarity score does not meet a threshold amount, the candidate cell is rejected as having a surrounding ADV feature space that is not similar enough to the HD map feature space to spend the overhead to perform a next kernel projection. Projection search module 301B can iteratively project the ADV feature space that surrounds each candidate cell onto the HD map feature space, using successive kernel projection dimensions, to obtain an updated similarity score. In an embodiment, if a candidate cell has an updated similarity score that does not indicate a sufficient degree of matching to the HD feature space, then the candidate cell can be marked as rejected. In an embodiment, projection search module 301B can iterate through each candidate in a first dimension, before iterating through each candidate for a second subsequent dimension of the projection kernels. In this embodiment, projection search module 301B can determine a highest similarity candidate at each iteration of a kernel projection dimension, and determine whether a single candidate has been the best matching candidate for more than one iteration of the non-rejected candidate cells. If so, this candidate cell may be deemed a best matching candidate as the center of the ADV feature space that should be aligned to the HD map feature space. In an embodiment, projection search module 301B can continue iterating through the candidate cells, using increasing dimensions of the projection kernels, until either a single candidate remains as the best candidate, or all candidates except one have been rejected, or all the non-rejected candidate cells have been iterated over all dimensions of the projection kernels, or a threshold number of non-rejected candidates remains. The remaining cells in the candidate space can form a second sub-set of the candidate space and can be searched using a similarity metric by similarity search module 301C.

Similarity search module 301C can search candidates in the second sub-set of candidate cells. The candidate cells in the second sub-set have not searched by projection search module 301B. For each candidate searched by similarity search module 301C, a candidate is selected for search, and a candidate space of ADV feature cells surrounding the candidate cell, e.g. 1024×1024 cells, can be matched to the HD map feature space of, e.g. 1024×1024 cells. In an embodiment, the candidate space of ADV feature cells surrounding the candidate cell can be 1024×1024 cells. Matching of an ADV space surrounding the candidate cell is performed using a similarity metric that performs a hybrid Gaussian fit of the candidate cell feature space (e.g. 1024× 1024 cells) to the HD map feature space (e.g. 1024×1024 cells). The similarity metric formula is as follows:

$$P(z|x, y, m) = \Pi_{i,j} \exp\left(\frac{-(m_{r_{(i-x,j-y)}} - z_{r_{(i,j)}})^2}{2*(m_{\sigma_{(i-x,j-y)}} + z_{\sigma_{(i,j)}})^2}\right)^\alpha ;$$

wherein P(z|x, y, m) represents a similarity score for the candidate feature space surrounding a candidate cell to the HD map feature space, i and j are iterators each ranging from 1 . . . 1024, (x, y) are the coordinates of a candidate cell, m represents map feature space cell data, z represents ADV feature space cell data, r represents the mean of a value, σ represents the variance of a value, and a is a tuning parameter. In an embodiment, the mean intensity of ADV and HD map feature space cell data are used in the numerator of the exp function and the variance of elevation of ADV and HD map feature space data is used in the denominator of the exp function. The similarity metric used to determine a similarity score for each candidate cell in the second sub-set of the 32×32 candidate space of cells. A highest similarity score from among the candidate cells is determined. An offset from the ADV coordinate in the ADV feature space to the best matching cell can be used to determine the high resolution location of the ADV with respect to the HD map feature space.

Projection search module 301B and similarity search module 301C can use all, or part, of the similarity metric above to determine a similarity score for an ADV feature space surrounding a candidate cell to the HD map feature space. In an embodiment, projection search module 301B can project an ADV feature space of a candidate cell onto the HD map feature space and use the similarity metric as a measure of similarity of the ADV feature space to the HD map feature space for each kernel projection in the set of kernel projections. Similarity score represents an iterated product of values that are each less than or equal to 1.0 similarity. Since the product of a set of numbers, each less than 1.0, can only get smaller, and most of the similarity between the ADV feature space surrounding a candidate cell and the HD map feature space is captured in the first few, e.g. five, dimensions of the kernel projections, it can be readily determined whether a candidate cell should be rejected, because the similarity metric is so low that the ADV feature space of the candidate will never be sufficiently similar to the HD map feature space to be deemed a best similarity match for the HD map feature space.

In another embodiment, the similarity metric can be expressed as a log-sum of terms whose sum is always increasing. In this embodiment, the ADV feature space of a candidate cell is most similar to the HD map feature space when the similarity score log-sum is the lowest value. In this embodiment, the similarity metric can drop one or more of the exp, α, the ½ factor within the parenthesis to a power, and signs can square values can be dropped. In this embodiment, when the sum of the terms in the similarity metric is above a threshold value, it can be determined that the candidate cell should be rejected because the similarity metric will never be low enough to indicate a best match of the ADV feature space surrounding the candidate cell to the HD map feature space.

Similarity search module 103C can use the similarity metric, above, in its entirety as-written, to determine a similarity score between an ADV feature space surrounding a candidate cell to the HD map feature space. In an embodiment, projection search module 301B processes a first sub-set of the candidate cells and rejects candidate cells having a similarity score that indicates that the ADV features space surrounding the candidate cell is not a good match to the HD map feature space. When only a threshold number of unrejected candidate cells remains, then a second sub-set of the candidate cells, comprising the remainder of the unrejected candidate cells, can be searching using the similarity search module 301C, until a best matching candidate cell is found that is the center of the best matching ADV feature space to the HD map feature space. This best similarity candidate cell can be used to compute an offset into the HD feature space that determines the ADV location within the HD map feature space.

Perception and planning system 110 can also include a perception module 302. Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 can make a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules, which may be stored in persistent storage device 352 (not shown).

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/ path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and steering commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Map update module 306 can be used to gather ADV feature space data and obtain an HD map feature space at an approximate location of the ADV, align the ADV feature space to the HD map feature space using techniques as described above for localization module 301, and upload the ADV feature space, with reference to the corresponding HD map feature space, to a server, such as server 103 for analysis and preprocessing for use by an ADV.

Persistent storage device 352 can include map and route information 311 and map grid 312. Map and route information can be used to determine a sequence of navigation operations to arrive and a destination. Navigation operations can be expressed as arcs in a graph with weights and attributes that characterize the route, such as speed, traffic, signals, road type, etc. Map grid 312 can be a complete map grid of all known HD map grid feature space within a certain driving locality, such as "within the U.S." or "within California" or "within San Francisco." In an embodiment, map grid 312 can be downloaded as needed from a server, e.g. server 103 or 104, for a radius around the ADV, such as a 100 mile radius.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
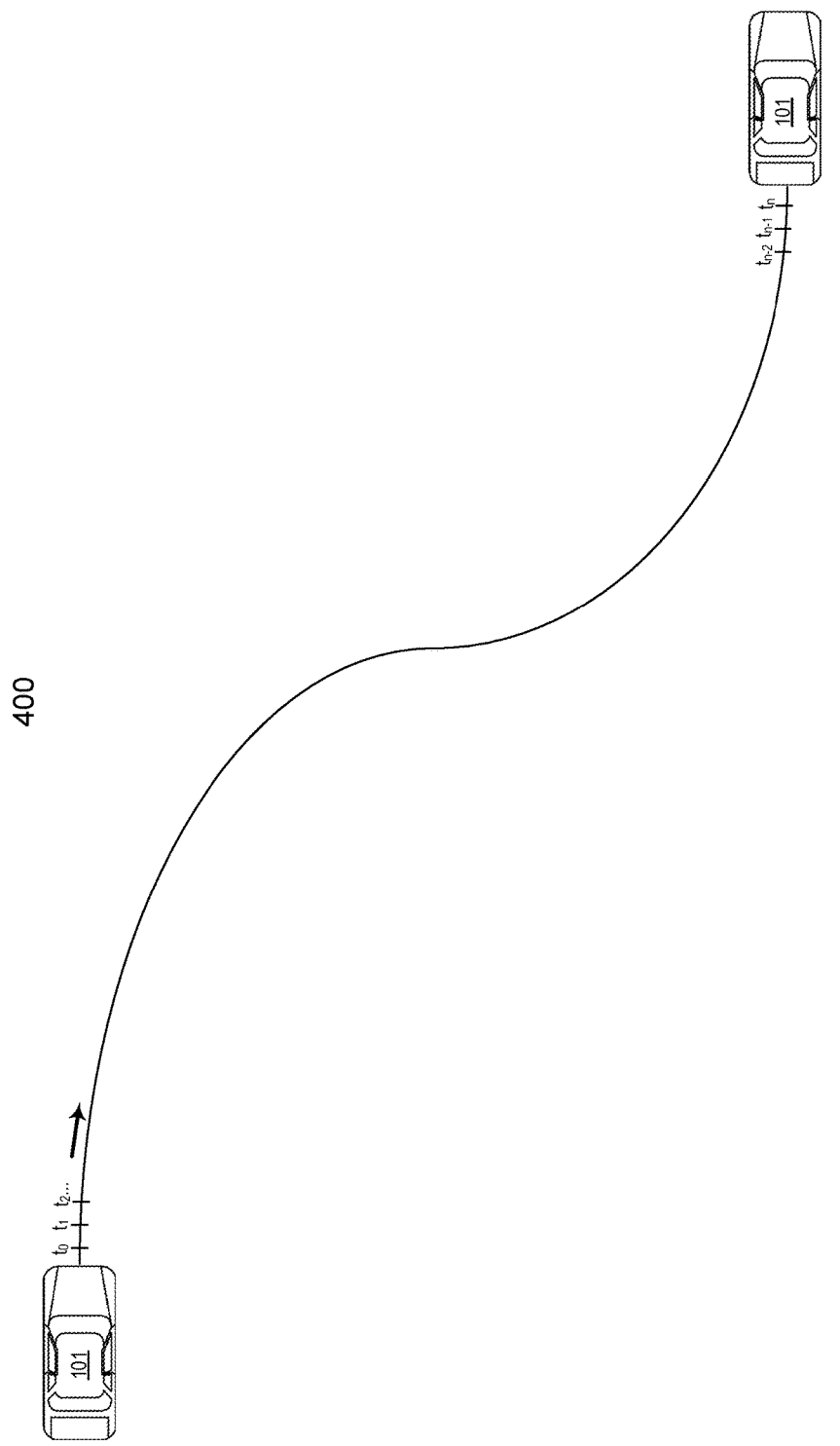
FIG. 4 illustrates an ADV driving on a particular course while ADV state data is collected at times $t_0, t_1, t_2, \ldots t_{n-2}, t_{n-1}$, and $t_n$, according to some embodiments.

FIG. 4 illustrates and ADV an ADV driving on a particular course while ADV state data is collected at times $t_0$, $t_1$, $t_2$, ... $t_{n-2}$, $t_{n-1}$, and $t_n$, according to some embodiments.

An ADV 101 can be programmed with a starting location and a destination or ending location. In an embodiment, a test engineer can utilize a test course having the same starting and ending locations, as well as path, to train a state database 204 of an ADV 101. The course may be repeated a number times over many miles of use of the ADV 101, to determine differences between stored state data and measured real-time state data at substantially the same location and speed as an initial trip on the test course. The differences between stored state data and measured state data can be used build state database 204, and to train and test state analysis module 205, parameter update module 103B, and service interval module 103C.

To build state database 204, ADV 101 can start on a course at a time t0=t, at a first location, with a first speed and heading. Sensor module 115 and control system 111 can determine a current state of the ADV 101 at t0, including heading, speed, location, throttle input, brake input, steering input, and other sensor data such as pitch, roll, acceleration, moisture, or road conditions. State database 204 can store the ADV state at time $t_0$. At time $t_1=t_0\Delta t$, sensor module 115 and control system 111 can again measure the ADV state. The ADV state at time $t_1$ is a "next state" for the ADV state at time t0. State database 204 can store the ADV measured real-time next state data for time $t_1$ as the next state of the current state, t0. State database 204 can also store a reference to the stored state data for t1 as being the current ADV state for time $t_1$. At time $t_2=t_1+\Delta t$, sensor module 115 and control system 111 can again measure a real-time state of the ADV, this time for $t_2=t_1+\Delta t$. State database 204 can store the ADV state data for $t_2$ as being the next state for ADV state $t_1$. State database 204 can also store a reference to the ADV state data for $t_2$ as being the current state of the ADV at time $t_2$. The process repeats, until a time $t_{n-1}$. At time $t_{n-1}$, measured state data for current state $t_{n-1}$ can be stored in the state database. At time $t_n$, at the end of the course, measured real-time ADV state data for $t_n=t_{n-1}+\Delta t$ can be stored for as the next state of $t_{n-1}$. A reference to the stored data for $t_n$ can also be stored as the current state of $t_n$. Since the end of the course occurred at time $t_n$, there will be no next state data stored in association with current state data for time $t_n$. A stored state record with no stored next state data can be handled as described below. While building the state database 204 for this course, each state and next state is being measured for the first time.

Thus there is no difference between the stored state data for a location and speed and for the measured state data for the location and speed, because they are literally the same data.

The next time that the ADV 101 traverses the same course, there will already be existing stored state data in the state database 204 from the previous run of the course that built the state database for the course.

Again, on the same course, at a starting a time $t=t_0$, sensor system 115 and control system 111 can measure the real-time ADV state data. The location and speed of the ADV 101 at time $t_0$ are looked up in the state database 204. The current state data at time $t_0$ and next associated state data at time $t_1=t_0+\Delta t$ are retrieved from the state database 204. At time $t_1=t_0+\Delta t$, sensor system 115 and control system 111 can measure real-time ADV state data for time $t_1$. State analysis module 205 can compare the stored state data from time $t_1$ with the measured state data at time $t_1$. In response to determining that one or more state ADV data fields from t1 differ from the stored ADV state data fields for $t_1$, then state analysis module 205 can determine changes to one or more control input parameters to correct tune to the control system 111 of the ADV 101. The process can continue, iteratively, until the course test course drive is finished.

The above process need not be performed repetitively on the same course. Using repetitive trips on the same course is merely a convenient way to detect changes to the ADV 101 performance over time for a known set of driving states. In practice, a user may drive a collection of same routes, of portions thereof, on a regular basis. For example, a person may have a set of regularly traveled courses, such as home to a grocery store and back, home to work and back, home to school and back, or other repetitive course in their daily life. As the ADV 101 and its subsystems begin to wear and age, control input parameters may need to change to keep the ADV on course, within legal operation, ensuring safety and comfort of the passengers. ADV State analysis module 205 will make the necessary control input parameter changes.

FIG. 5 illustrates a table of ADV state data 501 used to determine changes in vehicle performance and for tuning ADV control input parameters, according to some embodiments.

A stored database 204 of state data for an ADV can include stored ADV state data 501. Stored ADV data 501 can include index 505, current state date 510 at time t=current, and next state data 515 at time t+Δt. Stored data 501 can be compared with real-time ADV state data 502. Real-time ADV state data 502 can include ADV measured real-time next state data 515', that will be compared to stored ADV next state data 515 to determine differences between stored next state data 515 and measured real-time next state data 515'.

An example ADV state data record 550 at $t=t_0$ can be indexed by location 510 and speed 515 of the ADV. In an embodiment, index 505 can further include a heading of the vehicle. A location 510 can be a GPS location or a location within a high-definition (HD) sensor map corresponding to a GPS location. In an embodiment, the location 510 can be looked up using a tolerance for accuracy, such as ±0.1 meters accuracy, ±3 HD sensor map cells, or other tolerance. Speed 515 can be in miles per hour (mph), kilometers per hour (kph), meters per second (mps) or other vehicle speed unit of measure. In an embodiment, speed can be looked up using a tolerance for accuracy, such as ±0.1 kph, or other tolerance.

Example stored ADV state data record 550 at $t=t_0$ can further include current state data 510 for $t_0$, such as state data 520 and control inputs 525 of the ADV at time $t_0$. State data 520 can include a heading of the ADV (which can also be used as an index to the data record), a pitch of the ADV, and a roll of the ADV. Other ADV state data 520 can include a forward/backward acceleration and a left/right (lateral) acceleration (not shown), or up/down (lifting, bouncing, or "bottoming out", not shown), tire pressure sensor(s) for one or more tires, and shock absorber position sensor(s) for one or more shock absorbers (not shown). Pitch can include a forward/backward tilt to the ADV, such as indicating that the ADV is headed uphill or downhill. Roll can include an indication of whether the vehicle is tilting left or right, or is laterally flat (not tilted). A heading can be measured with reference to magnetic north, such as 0° meaning that the ADV heading is north. Pitch can be measured as an angle with respect to a forward/backward axis of the ADV. Pitch can be an angle, such as +2° indicating a downhill grade and −1° indicating an uphill grade, or 0° indicating that the car is on a flat road. Roll can be measured as an angle with respect to a left/right axis of the ADV. Roll can be an angle, such as −0.5° indicating a tilt to the left or +0.75° indicating a tile to the right of the vehicle.

ADV next state data t+Δt 515 can include the same type of information as current state information at time t, 505 and 510, except that ADV next state data 515 represents the stored next ADV state for time t+Δt. Stored next state data 515, which comprises next state data 530 an control inputs 535, has been previously measured and stored in the ADV state database 204 for time t+Δt. If ADV next state data 515 at time t+Δt does not yet exist for a particular ADV state record, then measured real-time ADV next state data 502 for time t+Δt 515', can be measured and stored in state database 204 as ADV stored next state 515, in association with the ADV state record, e.g. 550, for which the measured real-time ADV data 515' at time t+Δt is a next state. If ADV next state data t+Δt 515 for, e.g. ADV state record 550, already exists in ADV state database 204, then real-time data 502 for ADV next state t=t+Δt 515' can be measured. Then, state analysis module 205 can compare the stored ADV next state data 515 with the real-time ADV next state data 515'.

As an example, consider ADV state 555 at time $t_1$ and state 560 at time $t_2=t_1+\Delta$. At time $t_1$, the ADV state 520 had a heading of +3° and speed of 4.9 mps. At time $t_2=t_1+\Delta t$, the stored next state data 515 for record 555 indicates that the ADV should have a heading of +6° and speed of 4.7 mps. By comparing heading and speed of times $t_1$ and $t_2$, it can be seen that the ADV is slowing down and turning slightly to the right. As shown in ADV state record 555, to accomplish the slowing and turning indicated in the stored next state 515 for record 555, when record 555 was stored, the ADV control system 111 used control inputs of 1.5% brake, 0% throttle, and +3.0° steering. Comparing the measured real-time ADV next state data 515' for record 555 with the stored ADV next state data 515 for record 555, it can be seen that the ADV control system 111 and state analysis module 205 needed to increase braking to 2.5% and increase steering input to +4.0% to achieve the target speed and location of stored next state $t_2=t_1+\Delta t$, as shown in index 505 and current state 510 of ADV state record 560. ADV stored state record 555 next state data $t_1+\Delta t$ 515 as compared with measured ADV next state data 515' also indicates an increase in roll from −0.2° to −0.3° (while turning right, and braking, roll in the opposite direction of the steering input has increased). ADV state analysis module 205 can perform the above comparison and determine whether the brake pads may have worn, the steering system may have worn, the shock absorbers may have worn, or a combination of these.

Figure 6:
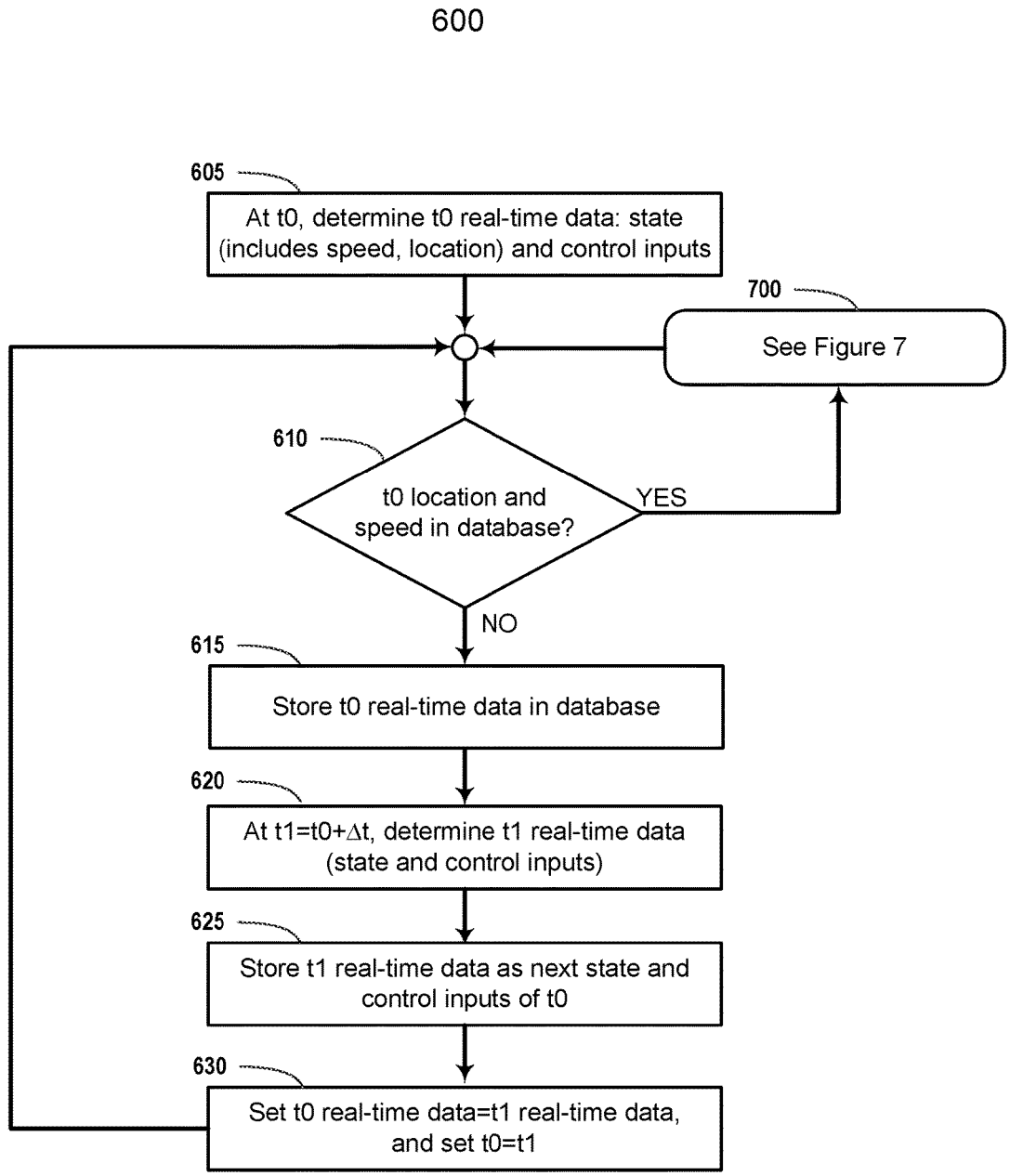
FIG. 6 illustrates a method of building a state database of ADV driving states, according to some embodiments.

FIG. 6 illustrates a method 600 of building an ADV state database 204 of ADV driving states, according to some embodiments.

In operation 605, at time $t_0$, ADV can perform a real-time measurement of ADV location, speed, and ADV state information using sensor system 115.

In operation 610, it can be determined whether there is a record in the ADV state database 204 corresponding to the measured speed and location of the ADV. In an embodiment, speed and location of the ADV form an index by which state database 204 stores and looks up ADV state records. In an embodiment, the index can further include a heading of the ADV. In practice, a vehicle, ADV or conventional, is rarely at precisely the same location at precisely the same speed more, as measured within the high accuracy of the ADV sensor system 115. Thus, lookup of ADV state database records using speed, location, and optionally heading, can be performed using a tolerance to find an ADV state database 204 record that is substantially identical to the measured real-time ADV state. In an embodiment, each index element (speed, location, and optionally heading) can have a tolerance used for lookup. For example, a database query to state database 204 can query for a record having a speed±0.1 mps, a location±0.1 m, and optionally a heading±0.02°. Values for tolerances can be adjusted to increase performance and accuracy of data storage and retrieval.

If, in operation 610, it is determined that an ADV state database record exists for the speed, location, and optionally heading, then method 600 continues at operation 700. Operation 700 is described below with reference to FIG. 7. After operation 700, method 600 continues at operation 610 at a next speed, location, and optionally heading. Otherwise, method 600 continues at operation 615.

In operation 615, real-time measured ADV state data can be stored in a database record that is indexed by the speed, location, and optionally heading, for the current ADV state. ADV state data record fields are described above with reference to FIG. 5.

In operation 620, at a time $t_1=t_0+\Delta t$, real-time ADV state data can be measured using sensor system 111. Sensor system 111 can measure both the ADV state and control inputs. Time $t_1=t_0+\Delta t$ corresponds to a next state for $t_0$. Since the ADV state record for $t_0$ was just generated in operation 615, the measured real-time ADV state for $t_1=t_0+\Delta t$ can represent the stored current stored ADV state for time $t_1$.

In operation 625, current state information for state $t_1=t_0+\Delta t$ can be stored in ADV state database 204. Since current ADV state $t_1$ corresponds to the next state for $t_0$, the ADV state record for $t_0$'s next state field can use a pointer or reference to the current state record data for time $t_1$. Alternatively, the ADV current state data for time $t_1$ can use a pointer or reference to $t_0$'s next state record data. In an embodiment, each of $t_0$'s next state and $t_1$'s current state data can store its own copy of the measured real-time data at time $t_1$.

In operation 630, measured real-time data for time t0 can be set to measured real-time data for time t1, and time t0=t1. Method 600 continues at operation 610.

Figure 7:
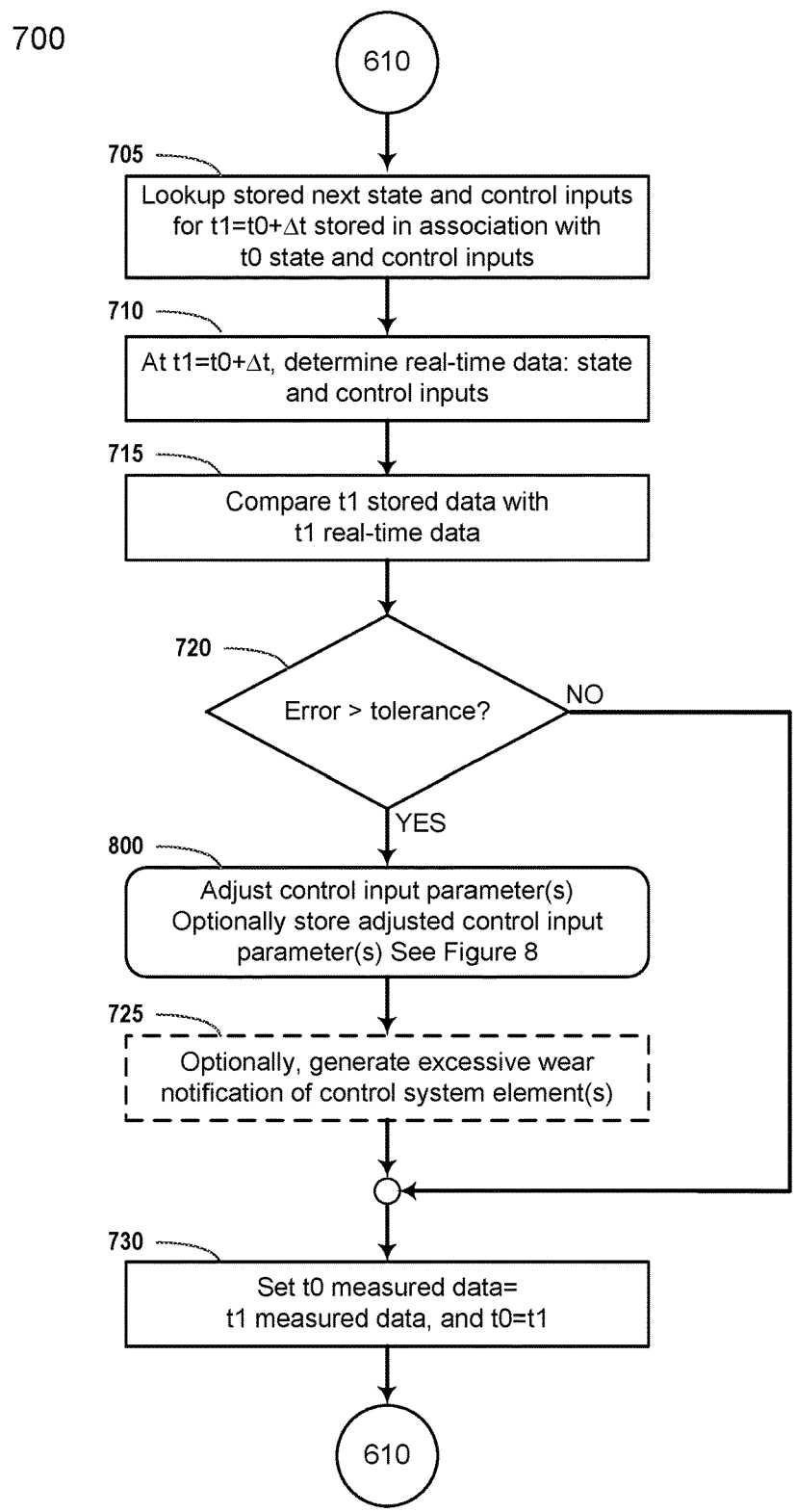
FIG. 7 illustrates a method of accessing the database of ADV historic driving states, determining real-time state data, and performing driving parameter adjustment(s), according to some embodiments.

FIG. 7 illustrates a method 700 of accessing the ADV state database 204 of ADV historic driving states, determining real-time state data, and performing control input parameter adjustment(s), according to some embodiments. Method 700 is called from method 600, operation 610, where it is determined that there is an ADV state record in database 204 corresponding to real-time data measured at a time t0.

In operation 705, the database record can be looked up that corresponds to the measured speed, location, and optionally heading of the ADV at time t0. In an embodiment, one or more of speed, location, and optionally heading, can use a tolerance when performing the lookup. The tolerance(s) can be tuned to balance speed of lookup, size of the database, and tolerances of the sensors of sensor system 115. In an embodiment, a test engineer may use a test track with a known course to repeatedly test a same ADV on the course. A goal of such a test can be to determine how well the ADV control system 111 performs when physical components of the ADV change over time, such as tires, shock absorbers, steering and alignment systems, and the state of tune of the engine of the ADV. A further goal of such a test can be to determine changes in one or more control input parameters to the control system 111 to hold the vehicle on course and within safety and comfort specifications during the course When running the same test course repeatedly, the ADV start, end, and intermediate locations may vary slightly due to road conditions, ADV subsystem wear, or other factors. Accordingly, ADV state database records can be looked up using an appropriate toleration on location, speed, and optionally heading of the ADV. For example, location could have a lookup tolerance of ±0.1 meter and/or speed within ±0.05 meters per second. Without tolerances on the index values of location, speed, and optionally heading, the ADV state database 204 would grow quite large as it would store records to the very high accuracy of the sensor system 115.

In operation 710, at time $t_1=t_0+\Delta t$, sensor system 115 and control system 111 can determine a real-time measurement of the ADV state and control inputs.

In operation 715, state analysis module 205 can compare stored ADV state data 515 for time t1, looked up in operation 705, and measured real-time ADV state data 515' of operation 710, to determine differences in state of the ADV at time t1.

In operation 720, state analysis module 205 can determine whether there are one or more differences between stored and measured element(s) of ADV next state data that exceed a tolerance threshold of the element(s). As illustrated in example ADV state record 555 of FIG. 5, in box 575, to maintain course, the ADV control system may have needed to increase brake input from 1.5% (stored) to 2.5% (measured) and increase steering input from +3° to +4°, resulting in an increased roll from −0.2° to −0.3°. Other sensors (not shown), such as a lateral accelerometer, shock absorber position(s), and tire pressure may indicate further differences in ADV state and can point to a cause for the need to increase brake and steering input to maintain course. Each ADV state element (e.g. pitch, roll, steering input, braking input, etc.) can have a different error tolerance value.

If, in operation 720, it is determined that one or more differences between ADV state elements, from the comparison of stored vs. measured next state at time $t_1$, have a difference that is greater than a tolerance value for the state element(s), then method 700 continues at operation 800, otherwise method 700 continues at operation 730.

In operation 800, state analysis module 205 can determine one or more control input parameters to adjust for the ADV. In the example of state database record 555, box 575, of FIG. 5, the control system 111 needed to increase braking from 1.5% to 2.5% and steering input from +3° to +4° to meet a test course location at time $t_1$. State analysis module 205 can determine that braking inputs should be increased to compensate for wearing of the brake pads or brake discs or drums. Similarly, state analysis module 205 can determine that steering inputs should be increased to compensate for wear to the tires, shock absorbers, or state of alignment of the from wheels of the ADV. Adjusting control input parameters is described in detail, below, with reference to FIGS. 8A and 8B.

In operation 725, state analysis module 205 can optionally generate an excessive wear notification to the ADV communication system 112, user interface system 113, and/or service interval module 130.

In operation 730, variables can be reset for a next iteration of method 600 before returning to method 600, operation 610. Measured ADV state data $t_0$ for the next loop iteration is set equal to measured ADV state data $t_1 = t_0 + \Delta t$ of this loop iteration, and time $t_0$ for next loop iteration is set to $t_1 = t_0 + \Delta t$ for the next loop of method 600.

Figure 8A:
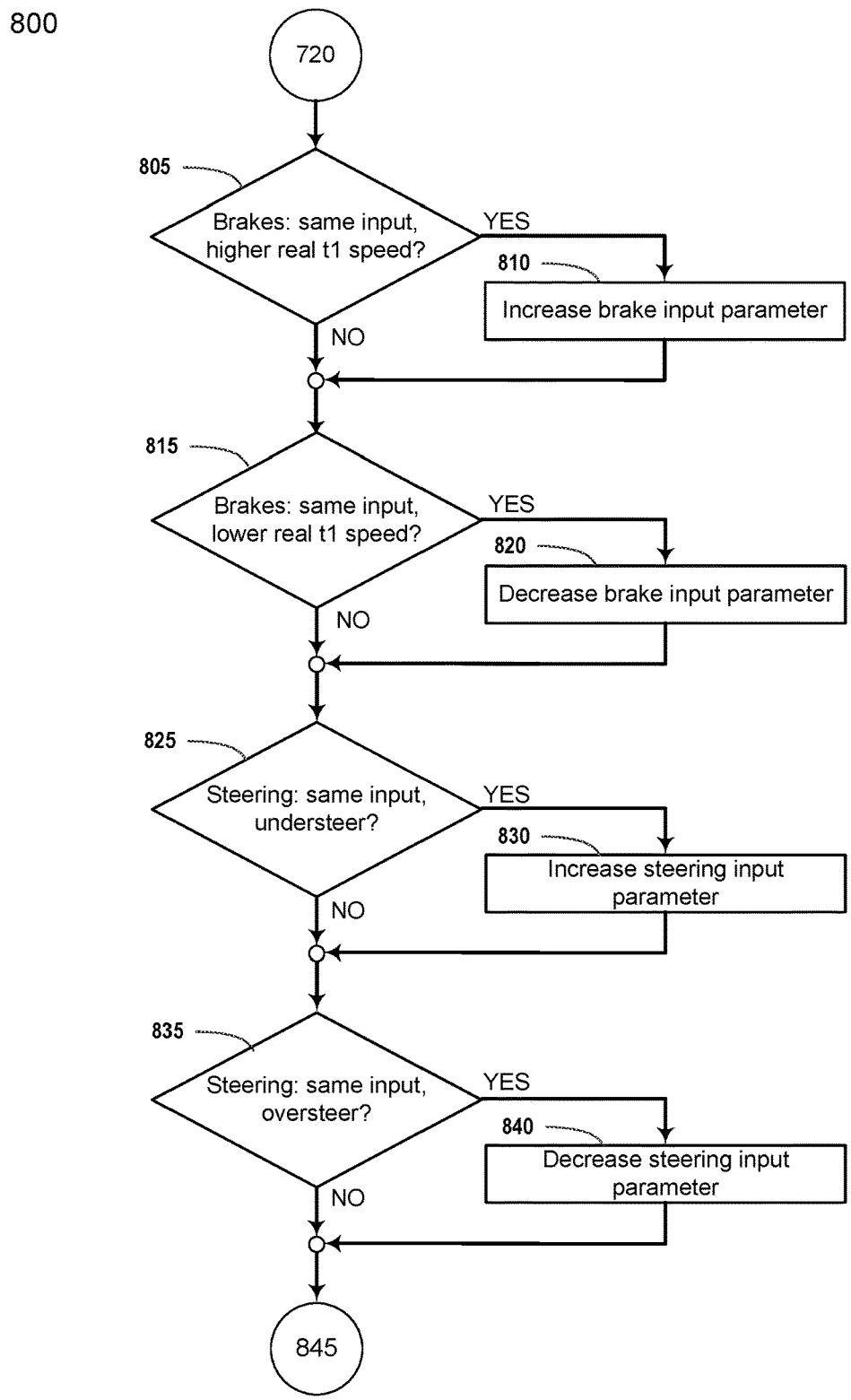
FIGS. 8A and 8B illustrates a method of determining ADV driving parameter adjustments based on changes to driving state data, according to some embodiments.
Figure 8B:
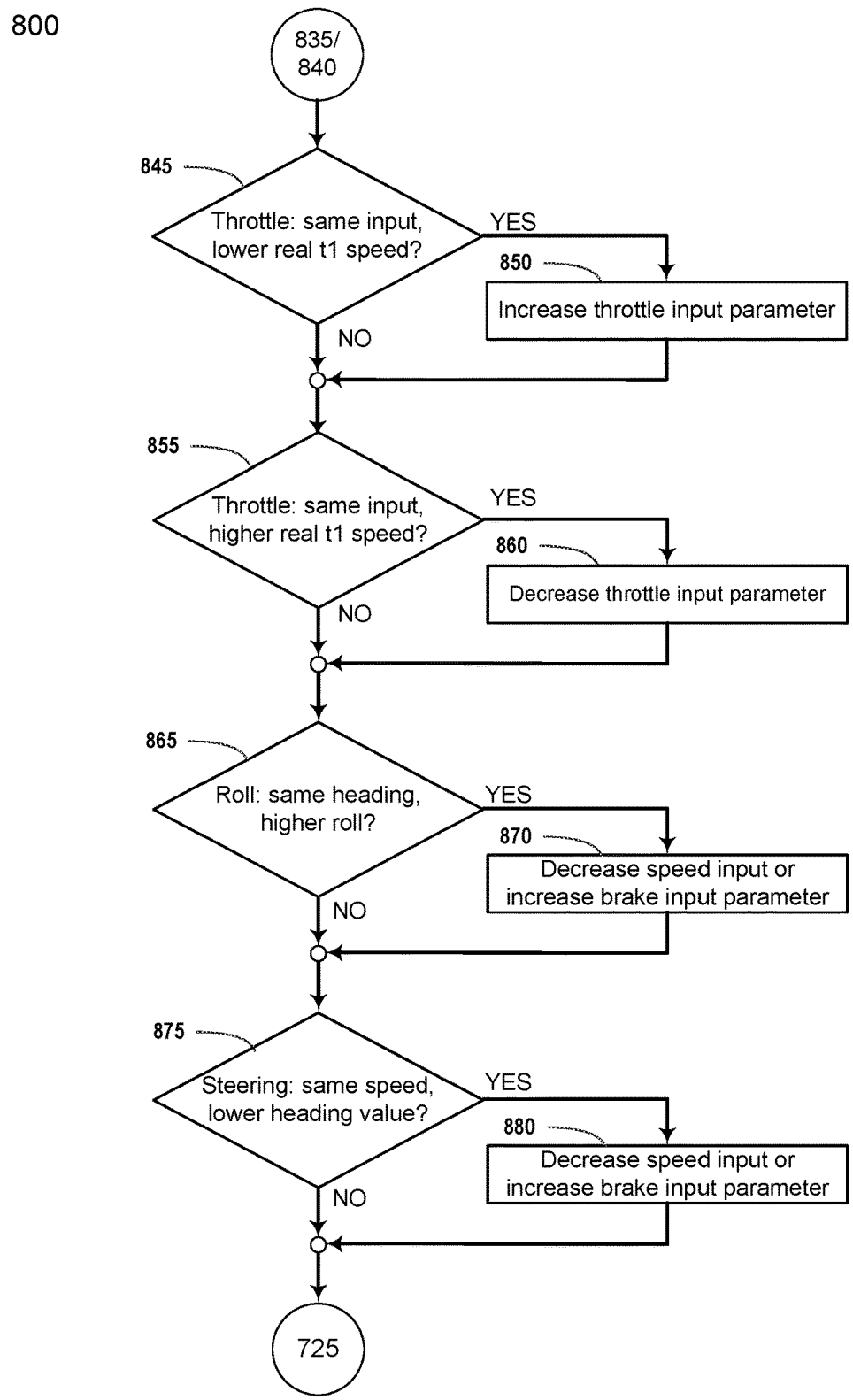

FIGS. 8A and 8B illustrate a method 800 of determining ADV control input parameter adjustments based on changes to driving state data, according to some embodiments. Method 800 is called from method 700. Before method 800 is called from FIG. 7, a stored next ADV state for time $t_1 = t_0 + \Delta t$ has been compared with a measured next ADV state for the same time $t_1 = t_0 + \Delta t$. It has further been determined that one or more elements of the ADV next state comparison is out of tolerance by more than a threshold amount for that element. The control input parameter adjustment logic of FIGS. 8A and 8B is exemplary, and not limiting.

ADV control system 111 can have one or more adjustment parameters for control inputs for steering 201, throttle 202, and braking unit 203. Performance of a vehicle, an ADV or standard vehicle, depends on many variables that can include physical road conditions and state of repair of subsystems of the vehicle. In addition, given a steady state of repair for a subsystem, performance of the system may not be linear, nor should it be linear. For example, a steering system of a vehicle may need to be able to turn sharper with less effort in a parking lot than it would at freeway speed. Engine performance is typically non-linear with respect to a throttle input, depending upon the engine revolutions per minute (RPM), torque curve of the engine, and other variables. Accordingly, when the ADV state analysis module determines that a measured ADV state varies from a stored ADV state for a given location, speed, and optionally heading, the state analysis module 205 may adjust different control input parameters for a same control input, based upon operating conditions of the ADV. An example of different variables for control inputs is shown in the table below. An control input parameter can be a factor applied to stored or computed control inputs, to account for variations in ADV subsystems and operating conditions of the ADV. A control input parameter can take on a value that operates to increase, or decrease, a stored or computed control input. In an embodiment, a control input parameter can take on an additive value from −100% . . . +100%, or a scalar value such as −2.0 . . . +2.0, that modifies a stored or computed control input value. Each of the following exemplary control input parameter variables can also be used to determine when to send a notification to user interface 113, wireless communication system 112, or service interval module 103C. The following table of variables is exemplary and non-limiting.

In operation 805, state analysis module 205 can determine whether the measured brake control input 203 is substantially the same as the stored brake input for the ADV state, but the measured speed is more than a threshold amount higher than the stored speed for the ADV state. This could indicate increasing wear in the braking system, such as worn brake pads, discs, drums, or leaking hydraulic fluid. If so, then in operation 810, state analysis module 205 can increase a brake control input parameter. In an embodiment, the amount of brake control input parameter increase can be a fraction of the error amount, e.g. increase brake inputs by 50% of the error amount. Method 800 continues at operation 815.

In operation 815, it can be determined whether the measured brake control input 203 is substantially the same as the stored brake input for the ADV state, but the measured speed is less than the stored speed for the ADV state. This could indicate that the braking system has recently been recently serviced (increased braking performance) or an increased wear in wheel bearings, or low tire pressure. If so, then in operation 820 state analysis module 205 can decrease a brake control input parameter. Method 800 continues at operation 825.

In operation 825, it can be determined whether the measured steering control input 201 and the stored steering control input are substantially the same, but the ADV has moved past the target location for the course (under-steer). If so, then in operation 830, state analysis module 205 can increase a steering control input parameter. Method 800 continues at operation 835.

In operation 835, it can be determined whether the measured steering control input 201 and the stored steering control input are substantially the same for the ADV state, but the ADV has not reached the target location for the course (over-steer). If so, then in operation 840, state analysis module 205 can increase a steering control input parameter. Method 800 continues at operation 845, which is shown on FIG. 8B.

In FIG. 8B, operation 845, in can be determined whether the measured throttle input 202 is substantially the same as the stored throttle input for the ADV state, but the measured speed is more than a threshold amount lower than the stored speed for the ADV state. If so, then in operation 850, state analysis module 205 can increase a throttle control input parameter. Method 800 continues at operation 855.

In operation 855, state analysis module 205 can determine whether the measured throttle input 202 is substantially the same as the stored throttle input for the ADV state, and the measured speed is more than a threshold amount higher than the stored speed for the ADV state. If so, then the ADV may have recently had an engine service, or increase in tire pressure, or recently serviced wheel bearings. State analysis module 205 can decrease a throttle control input parameter. Method 800 continues at operation 865.

In operation 865, state analysis module 205 can determine whether the measured location, speed and heading of the ADV is substantially the same as the stored location, speed, and heading for the ADV state, but the measured roll is more

TABLE I

| Control input | 0-30 mph | 30-45 mph | 45-80 mph |
|---|---|---|---|
| Steering 201 | low_speed_steering_adj | mid_speed_steering_adj | high_speed_steering_adj |
| Throttle 202 | low_speed_throttle_adj | mid_speed_throttle_adj | high_speed_throttle_adj |
| Braking 203 | low_speed_braking_adj | mid_speed_braking_adj | high_speed_braking_adj | than a threshold amount higher than the stored roll for the stored ADV state. If so, then the shock absorbers may be wearing out. State analysis module 205 can decrease a speed parameter or increase a brake parameter of the ADV, or both. Method 800 continues at operation 875.

In operation 875, state analysis module 205 can determine whether the measured speed and steering input is substantially the same as the stored speed and steering input for the ADV state, but the heading value is a threshold amount lower than the stored threshold value (ADV did not hold course). If so, then tires may be worn, shock absorbers may be worn, or steering may be out of alignment. In operation 880, state analysis control module 205 can decrease speed input, increase brake input, increase steering input, or a combination of these.

Method 800 returns to method 700 at operation 725. Method 700 is described above with reference to FIG. 7.

Figure 9:
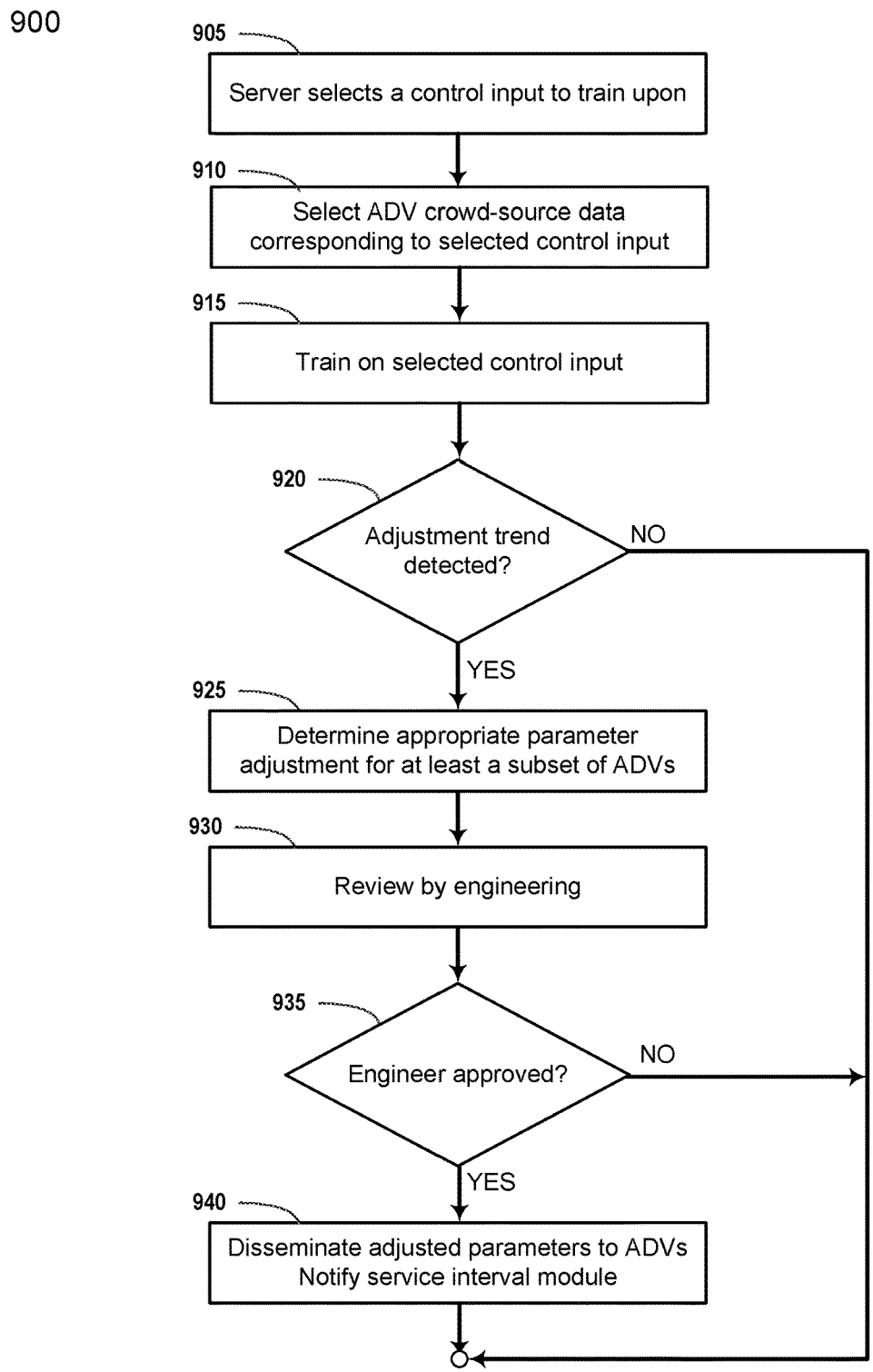
FIG. 9 illustrates a method of a server using crowd source data to learn whether a parameter update for one or more ADVs is appropriate, according to some embodiments.

FIG. 9 illustrates a method 900 of a server, e.g. server 103, using crowd source data to learn whether a control input parameter update for one or more ADVs is appropriate, according to some embodiments. In operation 905, server 103 selects a control input to train upon. A control input can be throttle input, steering input, or brake input. Each control input has one or more control input parameters that can be used to modify the specified control input, within a certain operating range of the ADV.

In operation 910, server 103 can select ADV crowd source data submitted from a large plurality of ADVs that have logged the selected control input modified by state analysis module 205 during operation of the ADV. In operation 915, machine learning engine 103A can train upon the crowd source data and selected control input, to determine one or more trends that correlate with adjustments to the selected control input parameter.

In operation 920, parameter updating module 103B can determine whether a trend is detected via the machine learning. If so, then method 900 continues at operation 925, otherwise method 900 ends. In operation 925, parameter updating module 103B can determine one or more of the control input parameter adjustments that are suggested for a subset of the large plurality of ADVs, based upon the machine learning and the selected control input.

In operation 930, supporting data and the suggested modification to the one or more control input parameters can be submitted for engineering review. In operation 935, if engineering approves the change(s) to the control input parameter(s) then in operation 940, the change(S) can be disseminated to at least a subset of the ADVs in the large plurality of ADVs. Optionally, a notification can also be sent to service interval module 103C. Service interval module 103C can disseminate an appropriate notification to the subset of the ADVs that indicate possible corrective services that could accompany the control input parameter change(s) disseminated to the ADVs.

When a service is performed upon an ADV, a log of the service can be stored in the ADVs persistent storage 252 or 352. In an embodiment, a service technician could reset one or more control input parameter changes made by the process in method 900, such as after a service has been performed on the ADV that is relevant to a control input parameter change.

Figure 10:
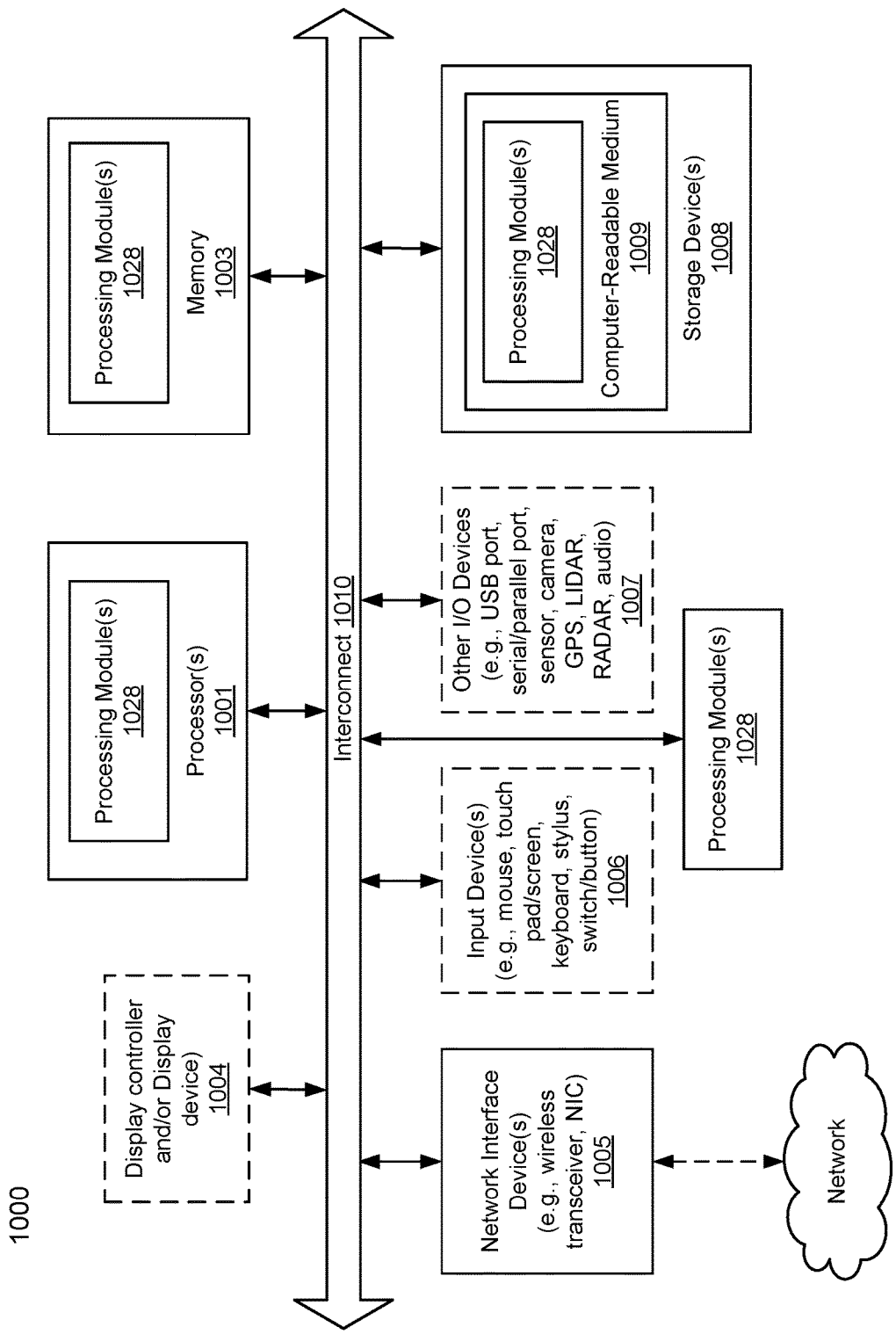
FIG. 10 is a block diagram illustrating a data processing system according to one embodiment.

FIG. 10 is a block diagram illustrating an example of a data processing system 1000 which may be used with one embodiment of the invention. For example, system 1000 may represent any of data processing systems described above performing any of the processes or methods described above, such as, for example, autonomous vehicle 101 systems, such as perception and planning 110, control system 111, infotainment system 114, etc., or any of servers 103-104 of FIG. 1. System 1000 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1000 is intended to show a high level view of many components of the computer system. However, it is to be understood that additional components may be present in certain implementations and furthermore, different arrangement of the components shown may occur in other implementations. System 1000 may represent a desktop, a laptop, a tablet, a server, a mobile phone, a media player, a personal digital assistant (PDA), an embedded processing controller, a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1000 includes processor 1001, memory 1003, and devices 1005-1008 via a bus or an interconnect 1010. Processor 1001 may represent a single processor or multiple processors with a single processor core or multiple processor cores included therein. Processor 1001 may represent one or more general-purpose processors such as a microprocessor, a central processing unit (CPU), or the like. More particularly, processor 1001 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1001 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions. In an embodiment, processor(s) 1001 comprise at least one hardware processor.

Processor 1001, which may be a low power multi-core processor socket such as an ultra-low voltage processor, may act as a main processing unit and central hub for communication with the various components of the system. Such processor can be implemented as a system on chip (SoC). Processor 1001 is configured to execute instructions for performing the operations and steps discussed herein. System 1000 may further include a graphics interface that communicates with optional graphics subsystem 1004, which may include a display controller, a graphics processor, and/or a display device.

Processor 1001 may communicate with memory 1003, which in one embodiment can be implemented via multiple memory devices to provide for a given amount of system memory. Memory 1003 may include one or more volatile storage (or memory) devices such as random access memory (RAM), dynamic RAM (DRAM), synchronous DRAM (SDRAM), static RAM (SRAM), or other types of storage devices. Memory 1003 may store information including sequences of instructions that are executed by processor 1001, or any other device. For example, executable code and/or data of a variety of operating systems, device drivers, firmware (e.g., input output basic system or BIOS), and/or applications can be loaded in memory 1003 and executed by processor 1001. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1000 may further include IO devices such as devices 1005-1008, including network interface device(s) 1005, optional input device(s) 1006, and other optional IO device(s) 1007. Network interface device 1005 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1006 may include a mouse, a touch pad, a touch sensitive screen (which may be integrated with display device 1004), a pointer device such as a stylus, and/or a keyboard (e.g., physical keyboard or a virtual keyboard displayed as part of a touch sensitive screen). For example, input device 1006 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Input/Output (I/O) devices 1007 may include an audio device. An audio device may include a speaker and/or a microphone to facilitate voice-enabled functions, such as voice recognition, voice replication, digital recording, and/or telephony functions. Other I/O devices 1007 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1007 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1010 via a sensor hub (not shown), while other devices such as a keyboard or thermal sensor may be controlled by an embedded controller (not shown), dependent upon the specific configuration or design of system 1000. I/O devices 1007 may further include a RADAR system (radio detection and ranging), a LIDAR system (light detection and ranging), a GPS system (global positioning system), cell phone subsystems that can detect and triangulate using cell towers, microphone(s), and other, audio/video recording camera(s), position, distance, time, speed, acceleration, horizontal and vertical level detectors, orientation, and directional sensors.

To provide for persistent storage of information such as data, applications, one or more operating systems and so forth, a mass storage (not shown) may also couple to processor 1001. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1001, e.g., via a serial peripheral interface (SPI). This flash device may provide for non-volatile storage of system software, including BIOS as well as other firmware of the system.

Storage device 1008 may include computer-accessible storage medium 1009 (also known as a machine-readable storage medium or a computer-readable medium) on which is stored one or more sets of instructions or software (e.g., module, unit, and/or logic 1028) embodying any one or more of the methodologies or functions described herein. Processing module/unit/logic 1028 may represent any of the components described above, such as, for example, autonomous vehicle 101 (AV) localization module 301, perception module 302, driving decision module 303, planning module 304, control module 305, map update module 306, and one or more modules to process sensor data to for driving the AV planning and control modules. Processing module(s) 1028 can further implement logic to build AV state database 204 and state analysis module 205, described above. Processing module/unit/logic 1028 may also reside, completely or at least partially, within memory 1003 and/or within processor 1001 during execution thereof by data processing system 1000, memory 1003 and processor 1001 also constituting machine-accessible storage media. Processing module/unit/logic 1028 may further be transmitted or received over a network via network interface device 1005.

Computer-readable storage medium 1009 may also be used to store the some software functionalities described above persistently. While computer-readable storage medium 1009 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1028, components and other features described herein can be implemented as discrete hardware components or integrated in the functionality of hardware components such as ASICS, FPGAs, DSPs or similar devices. In addition, processing module/unit/logic 1028 can be implemented as firmware or functional circuitry within hardware devices. Further, processing module/unit/logic 1028 can be implemented in any combination hardware devices and software components. Processing logic can include, e.g. logic to build state database 204 as described above, with reference to FIG. 6, logic to use and update state database 204 as described above with reference to FIG. 7, and logic to adjust one or more AV control input parameters as described with reference to FIGS. 8A and 8B, above. Processing logic can further include, e.g. logic to determine a location of an ADV with respect to the HD map feature space, using a kernel projection technique as implemented by projection search module 301B, or by similarity search module 301C.

Note that while system 1000 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of operating an autonomous driving vehicle (ADV), the method comprising:
   measuring, for a time t0, a first state of the ADV, wherein the first state comprises at least a speed and a location of the ADV and a plurality of control inputs that control the navigation of the ADV;
   accessing a state database indexed by at least the speed and the location of the ADV in the first state for the time t0, to retrieve a record of a stored first state of the ADV corresponding to the measured first state at time t0, and to retrieve a record of a stored second state of the ADV corresponding to a time $t1=t0+\Delta t$, wherein $\Delta t$ is a predetermined time increment;
   measuring a real-time second state of the ADV corresponding to the time t1;
   comparing one or more fields of the retrieved stored second state for the time t1 with the measured real-time second state of the ADV for the time t1;
   in response to determining that a difference between one or more fields of the retrieved stored second state and corresponding one or more fields of the measured real-time second state is greater than a threshold value, adjusting one or more control input parameters of the ADV.

2. The method claim 1, wherein the first state, the stored first state, the stored second state, and real-time second state each comprise one or more of: a location of the ADV, a speed of the ADV, a heading of the ADV, a pitch of the ADV, a roll of the ADV, control input for brakes, control input for throttle, or control input for steering.

3. The method of claim 2, wherein a brake control input parameter of the stored second state is within a threshold tolerance of a measured real-time state brake control input parameter, and the method further comprises one of:
   increasing the brake control input parameter in response to determining that the measured real-time state speed is greater than the second state speed by at least a speed error value; or
   decreasing the brake control input parameter in response to determining that the measured real-time speed is less than the second state speed by at least the speed error value.

4. The method of claim 2, wherein a steering control input parameter of the stored second state is within a threshold tolerance of a measured real-time state steering control input parameter, and the method further comprises one of:
   increasing the steering control input parameter in response to determining that the measured real-time state heading is less than the second state heading (under-steer) by at least a steering error value; or
   decreasing the steering control input parameter in response to determining that the measured real-time state heading is greater than the second state heading value (over-steer) by at least the steering error value.

5. The method of claim 2, wherein a throttle control input parameter of the stored second state is within a threshold tolerance of a measured real-time state throttle input parameter, and the method further comprises one of:

increasing the throttle control input parameter in response to determining the measured real-time state speed is less than the speed in the second state by a speed error value; or decreasing the throttle input parameter in response to determining that the measured real-time state speed is greater than the speed in the second state by the speed error value.

6. The method of claim 1, further comprising issuing an alert that one or more sub-systems of the ADV that respond to one or more ADV control inputs, are in need of adjustment or repair.

7. The method of claim 1, further comprising:
in response to determining that the record of the stored second state corresponding to the time t1 does not exist in the state database, storing the measured real-time second state of the ADV corresponding to the time t1 in the state database in association with the stored first state of the ADV corresponding to the time t0.

8. A non-transitory machine-readable medium having instructions stored therein, which when executed by a processor, cause the processor to perform operations, the operations comprising:
measuring, at time t0, a first state of an ADV, wherein the first state comprises at least a speed and a location of the ADV and a plurality of control inputs that control the navigation of the ADV;
accessing a state database indexed by at least the speed and the location of the ADV in the first state for the time t0, to retrieve a record of a stored second state of the ADV corresponding to the measured first state at time t0, and to retrieve a record of a stored second state of the ADV corresponding to a time t1=t0+Δt, wherein Δt is a predetermined time increment;
measuring a real-time second state of the ADV corresponding to the time t1;
comparing one or more fields of the retrieved stored second state for the time t1 with the measured real-time second state of the ADV for the time t1;
in response to determining that a difference between one or more fields of the retrieved stored second state and corresponding one or more fields of the measured real-time second state is greater than a threshold value, adjusting one or more control input parameters of the ADV.

9. The medium claim 8, wherein the first state, the stored first state, the stored second state, and real-time second state each comprise one or more of: a location of the ADV, a speed of the ADV, a heading of the ADV, a pitch of the ADV, a roll of the ADV, control input for brakes, control input for throttle, or control input for steering.

10. The medium of claim 9, wherein a brake control input parameter of the stored second state is within a threshold tolerance of a measured real-time state brake control input parameter, and the operations further comprise one of:
increasing the brake control input parameter in response to determining that the measured real-time state speed is greater than the second state speed by at least a speed error value; or
decreasing the brake control input parameter in response to determining that the measured real-time speed is less than the second state speed by at least the speed error value.

11. The medium of claim 9, wherein a steering control input parameter of the stored second state is within a threshold tolerance of a measured real-time state steering control input parameter, and the operations further comprise one of:
increasing the steering control input parameter in response to determining that the measured real-time state heading is less than the second state heading (under-steer) by at least a steering error value; or
decreasing the steering control input parameter in response to determining that the measured real-time state heading is greater than the second state heading value (over-steer) by at least the steering error value.

12. The medium of claim 9, wherein a throttle control input parameter of the stored second state is within a threshold tolerance of a measured real-time state steering throttle input parameter, and the operations further comprise one of:
increasing the throttle control input parameter in response to determining the measured real-time state speed is less than the speed in the second state by a speed error value; or
decreasing the throttle input parameter in response to determining that the measured real-time state speed is greater than the speed in the second state by the speed error value.

13. The medium of claim 8, the operations further comprising issuing an alert that one or more sub-systems of the ADV that respond to one or more ADV control inputs, are in need of adjustment or repair.

14. The medium of claim 8, further comprising:
in response to determining that the record of the stored second state corresponding to the time t1 does not exist in the state database, storing the measured real-time second state of the ADV corresponding to the time t1 in the state database in association with the stored first state of the ADV corresponding to the time t0.

15. A data processing system, comprising:
a processor; and
a memory coupled to the processor to store instructions, which when executed by the processor, cause the processor to perform operations, the operations including:
measuring, at a time t0, a first state of an ADV, wherein the first state comprises at least a speed and a location of the ADV and a plurality of control inputs that control navigation of the ADV;
accessing a state database indexed by at least the speed and the location of the ADV in the first state for the time t0, to retrieve a record of a stored first state of the ADV corresponding to the measured first state at time t0, and to retrieve a record of a stored second state of the ADV corresponding to a time t1=t0+Δt, wherein Δt is a predetermined time increment;
measuring a real-time second state of the ADV corresponding to the time t1;
comparing one or more fields of the retrieved stored second state for the time t1 with the measured real-time second state of the ADV for the time t1;
in response to determining that a difference between one or more fields of the retrieved stored second state and corresponding one or more fields of the measured real-time second state is greater than a threshold value, adjusting one or more control input parameters of the ADV.

16. The system claim 15, wherein the first state, the stored first state, the stored second state, and real-time second state each comprise one or more of: a location of the ADV, a speed of the ADV, a heading of the ADV, a pitch of the ADV, a roll of the ADV, control input for brakes, control input for throttle, or control input for steering.

17. The system of claim 16, wherein a brake control input parameter of the stored second state is within a threshold tolerance of a measured real-time state brake control input parameter, and the operations further comprise one of:
 increasing the brake control input parameter in response to determining that the measured real-time state speed is greater than the second state speed by at least a speed error value; or
 decreasing the brake control input parameter in response to determining that the measured real-time speed is less than the second state speed by at least the speed error value.

18. The system of claim 16, wherein a steering control input parameter of the stored second state is within a threshold tolerance of a measured real-time state steering control input parameter, and the operations further comprise one of:
 increasing the steering control input parameter in response to determining that the measured real-time state heading is less than the second state heading (under-steer) by at least a steering error value; or
 decreasing the steering control input parameter in response to determining that the measured real-time state heading is greater than the second state heading value (over-steer) by at least the steering error value.

19. The system of claim 18, wherein a throttle control input parameter of the stored second state is within a threshold tolerance of a measured real-time state throttle input parameter, and the operations further comprise one of:
 increasing the throttle control input parameter in response to determining the measured real-time state speed is less than the speed in the second state by a speed error value; or
 decreasing the throttle input parameter in response to determining that the measured real-time state speed is greater than the speed in the second state by the speed error value.

20. The system of claim 15, the operations further comprising issuing an alert that one or more sub-systems of the ADV that respond to one or more ADV control inputs, are in need of adjustment or repair.

21. The system of claim 15, further comprising:
 in response to determining that the record of the stored second state corresponding to the time t1 does not exist in the state database, storing the measured real-time second state of the ADV corresponding to the time t1 in the state database in association with the stored first state of the ADV corresponding to the time t0.

* * * * *